(12) United States Patent
Watanabe et al.

(10) Patent No.: US 7,647,864 B2
(45) Date of Patent: Jan. 19, 2010

(54) PISTON FOR HYDRAULIC CLUTCH

(75) Inventors: Toshiki Watanabe, Fukushima (JP);
Yoshiyuki Kanzaki, Fukushima (JP);
Kiichiro Goto, Fukushima (JP)

(73) Assignee: NOK Corporation (JP)

( * ) Notice: Subject to any disclaimer, the term of this patent is extended or adjusted under 35 U.S.C. 154(b) by 2 days.

(21) Appl. No.: 12/082,392

(22) Filed: Apr. 10, 2008

(65) Prior Publication Data

US 2008/0251347 A1 Oct. 16, 2008

(30) Foreign Application Priority Data

Apr. 12, 2007 (JP) .............................. 2007-104435

(51) Int. Cl.
*F16J 9/00* (2006.01)
*F16J 9/20* (2006.01)
(52) U.S. Cl. ......................................... 92/254; 277/437
(58) Field of Classification Search ................. 277/435, 277/437, 467, 572, 434, 438; 92/249, 254
See application file for complete search history.

(56) References Cited

U.S. PATENT DOCUMENTS

| 2,600,516 A | * | 6/1952 | Pielop, Jr. | .................... 277/437 |
| 5,492,053 A | * | 2/1996 | Stonehill | ..................... 92/241 |
| 6,702,293 B2 | * | 3/2004 | Endo et al. | .................. 277/500 |

FOREIGN PATENT DOCUMENTS

| JP | 2003-139249 | 5/2003 |
| JP | 2006-002915 | 1/2006 |

* cited by examiner

*Primary Examiner*—Vishal Patel
(74) *Attorney, Agent, or Firm*—Harness, Dickey & Pierce, P.L.C.

(57) ABSTRACT

A piston includes a piston main body and a seal ring. The seal ring has a metal ring including a fitting tube portion fitted to a cylinder portion of the piston main body and a flange portion extending radially to axially oppose a pressure receiving portion of the piston main body, and a rubber-like seal main body provided on the metal ring. The seal main body has a first seal lip contacting an inner surface of a clutch cylinder, a second seal lip extending from an end of the flange portion to contact the pressure receiving portion, and an axial direction compression seal portion provided on the flange portion and compressed toward the pressure receiving portion.

4 Claims, 6 Drawing Sheets

PISTON FOR HYDRAULIC CLUTCH

BACKGROUND OF THE INVENTION

1. Field of the Invention

The present invention relates to a piston used in a hydraulic clutch of an automatic transmission of a vehicle.

2. Description of the Conventional Art

A hydraulic clutch in an automatic transmission of a vehicle is structured such that a piston (a clutch piston) moving in an axial direction within a cylinder by a hydraulic pressure transmits a power from a drive shaft to a driven shaft by bringing a drive plate in the drive shaft side in a multiple disc clutch into pressure contact with a driven plate in the driven shaft side, and shuts off the power transmission by canceling the pressure contact state. Further, this kind of clutch piston generally employs a seal integral type piston (also called as a bonded piston seal) in which a seal portion made of a rubber-like elastic material and brought into close contact with an inner surface of a clutch cylinder is integrally formed in a piston main body.

Since this kind of automatic transmission tends to have multiple stages in recent years, and a front-wheel drive (FF) system has a constraint on space with respect to an axial direction, the clutch piston tends to be enlarged in diameter particularly in the automatic transmission having a great capacity. However, in the case that the clutch piston is constituted by the seal integral type piston as mentioned above, a metal mold apparatus or the like for integrally forming a seal portion in the piston main body becomes large in size if it is intended to manufacture a seal integral type piston having a large diameter. An increase of a manufacturing cost is unavoidable.

Accordingly, there has been conventionally developed a technique of manufacturing a seal ring as an independent member from a piston main body and fitting the seal ring in a close contact manner to the piston main body (refer to Japanese Unexamined Patent Publication No. 2003-139249 and Japanese Unexamined Patent Publication No. 2006-2915).

However, in Japanese Unexamined Patent Publication No. 2003-139249 of the conventional arts, since a thin portion is formed in a fitting portion to a cored bar of a seal ring in a piston main body, and a step portion for providing a lip sealing between the cored bar and the piston main body is formed in an inner peripheral portion of the cored bar, a working cost becomes high. Further, in Japanese Unexamined Patent Publication No. 2006-2915, since a similar step portion is formed in an inner peripheral portion of a cored bar of a seal ring, there is a problem that a working cost becomes high. Further, since a fitting portion between the cored bar and the piston main body is sealed by only one stage, Japanese Unexamined Patent Publication No. 2006-2915 has trouble with a sealing performance thereof.

SUMMARY OF THE INVENTION

Problem to be Solved by the Invention

The present invention is made by taking the points mentioned above into consideration, and a technical object of the present invention is to provide a piston for a seal fitting type hydraulic clutch which can increase a sealing performance of a fitting portion between a piston main body and a seal ring as much as possible and can be manufactured at a low cost.

Means for Solving the Problem

As a means for effectively solving the technical problem mentioned above, in accordance with a first aspect of the present invention, there is provided a piston for a hydraulic clutch comprising:

a piston main body having a pressure receiving portion extending in a diametrical direction and a cylinder portion bent from the pressure receiving portion so as to extend, and arranged within a clutch cylinder so as to be movable in an axial direction; and a seal ring fitted and attached to the piston main body, wherein the seal ring comprises:

a metal ring constituted by a fitting tube portion fitted and attached to the cylinder portion and a flange portion extending in a diametrical direction from one end in the axial direction so as to oppose to the pressure receiving portion in the axial direction; and a seal main body integrally provided in the metal ring by a rubber-like elastic material, wherein the seal main body comprises:

a first seal lip brought into close contact with a cylindrical inner surface of the clutch cylinder so as to be slidable in the axial direction;

a second seal lip extending from an end portion of the flange portion so as to be brought into close contact with the pressure receiving portion; and an axial direction compression seal portion provided in an opposing surface to the pressure receiving portion in the flange portion and interposed in a state of being compressed in the axial direction with respect to the pressure receiving portion.

In accordance with a second aspect of the present invention, there is provided a piston for a hydraulic clutch as recited in the first aspect, wherein the seal main body has a diametrical direction compression seal portion which is interposed between an opposing surface to a cylinder portion of the piston main body in the fitting tube portion of the metal ring and the cylinder portion in a state of being compressed in a diametrical direction, in the opposing surface.

Effect of the Invention

In accordance with the piston for the hydraulic clutch on the basis of the first aspect of the present invention, since the seal ring attached to the piston main body is structured such that the second seal lip extending from the end portion of the flange portion in the metal ring comes into close contact with the pressure receiving portion of the piston main body, a sealing performance of the fitting portion between the piston main body and the seal ring is improved, and the axial direction compression seal portion provided in the opposing surface to the pressure receiving portion in the flange portion is brought into close contact with the pressure receiving portion in the compression state. Accordingly, a two-stage seal structure is achieved, and the sealing performance becomes higher. Therefore, it is not necessary to work the piston main body side at a high precision, thereby contributing to a reduction of the working cost.

In accordance with the piston for the hydraulic clutch on the basis of the second aspect, since the seal ring has the diametrical direction compression seal portion, the sealing performance between the seal ring and the piston main body becomes higher, in addition to the effect obtained by the first aspect. Further, on the basis of the diametrical direction compression seal portion, it is possible to absorb a dispersion of the fitting force caused by a working error between the metal ring of the seal ring and the piston main body.

DETAILED DESCRIPTION OF PREFERRED EMBODIMENT

Figure 2:
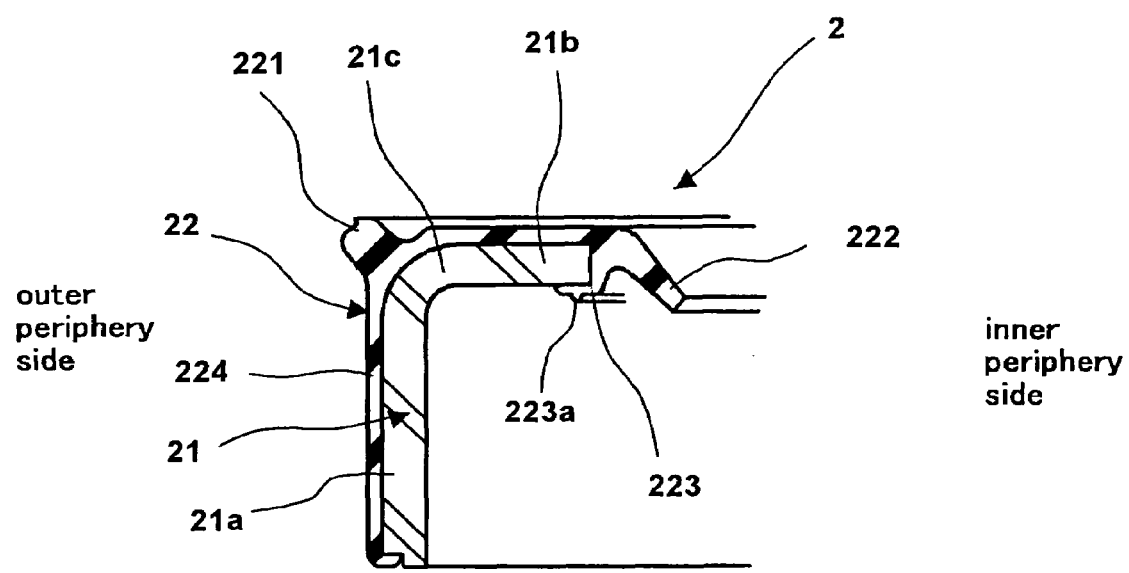
FIG. 2 is a cross sectional view of a main portion showing a modified example of a shape of a seal ring in the first embodiment by cutting a plane passing through an axis.
Figure 3:
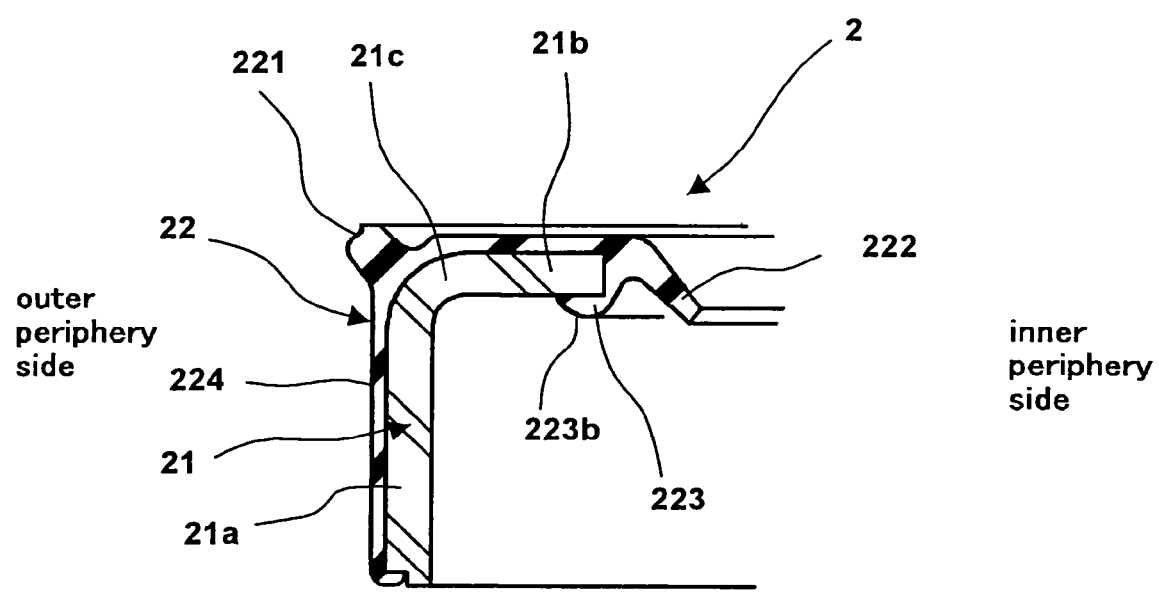
FIG. 3 is a cross sectional view of a main portion showing the other modified example of the shape of the seal ring in the first embodiment by cutting a plane passing through an axis.

A description will be given below of preferable embodiments of a piston for a hydraulic clutch in accordance with the present invention with reference to the accompanying drawings. First, FIG. 1 is a cross sectional view of a main portion showing a piston for a hydraulic clutch in accordance with a first embodiment by cutting by a plane passing through an axis together with a part of a clutch cylinder, and FIGS. 2 and 3 are respectively cross sectional views of a main portion showing modified examples of a shape of a seal ring in the first embodiment by cutting a plane passing through an axis.

Figure 1:
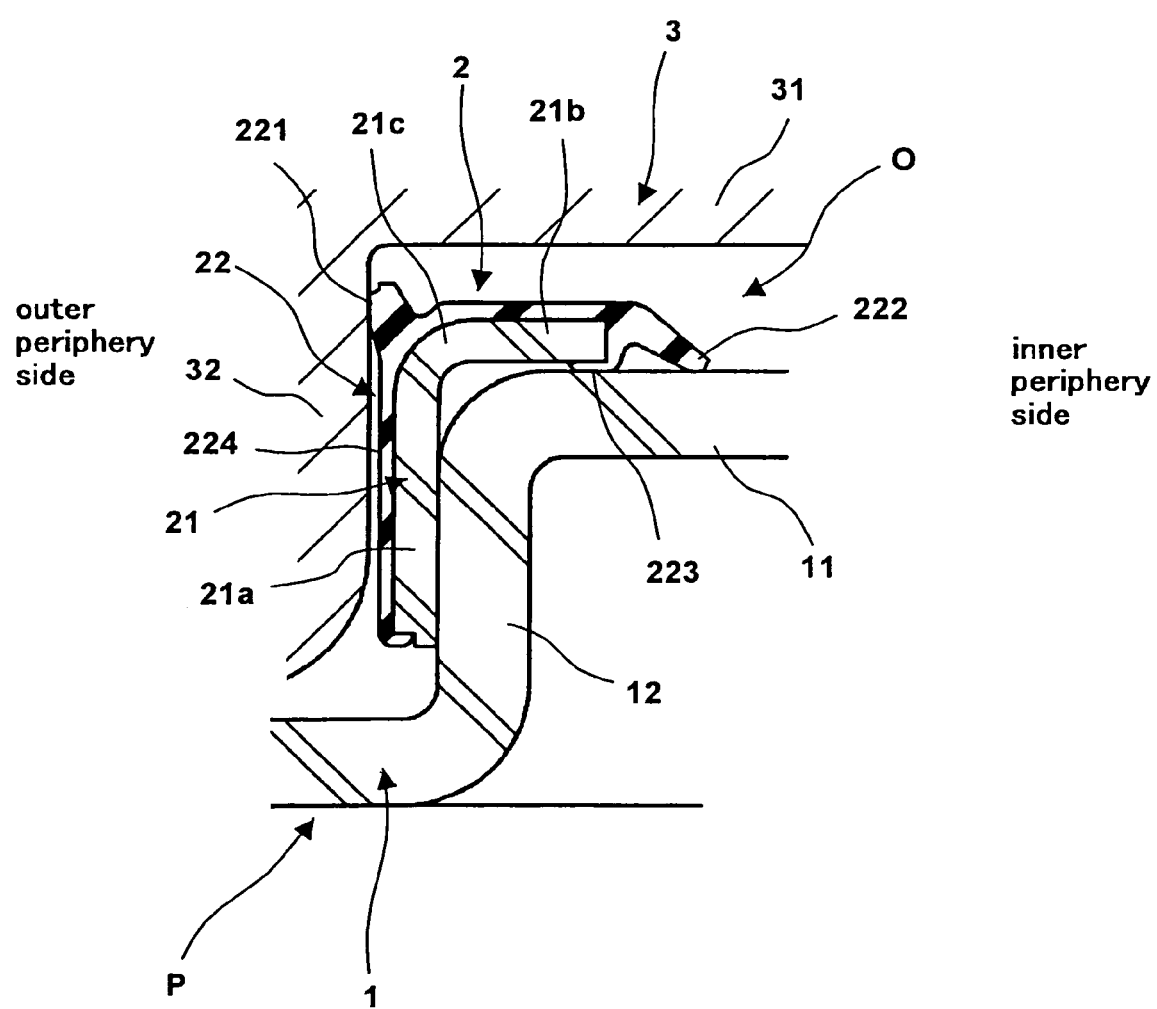
FIG. 1 is a cross sectional view of a main portion showing a first embodiment of a piston for a hydraulic clutch in accordance with the present invention by cutting by a plane passing through an axis together with a part of a clutch cylinder.

A piston for a hydraulic clutch (hereinafter, refer simply to as a piston) P shown in FIG. 1 is structured such as to move in an axial direction within a clutch cylinder 3 by a hydraulic pressure introduced to a hydraulic chamber O defined between the piston P and an end plate portion 31 of the clutch cylinder 3, and a return spring (not shown) arranged in an opposite side to the hydraulic chamber O, and connect or disconnect a clutch, and is constituted by a piston main body 1 arranged within the clutch cylinder 3 so as to be movable in the axial direction, and a seal ring 2 fitted and attached to the piston main body 1.

In detail, the piston main body 1 manufactured as an annular shape in accordance with a plastic working of a metal plate such as a steel plate or the like, and has a pressure receiving portion 11 extending in a diametrical direction so as to be opposed in an axial direction to the end plate portion 31 of the clutch cylinder 3, and a cylinder portion 12 extending in an opposite side to the hydraulic chamber O from an outer periphery of the pressure receiving portion 11. Further, the seal ring 2 is constituted by a metal ring 21 in which a cross sectional shape cut by a plane passing through an axis is approximately formed as an L-shaped form, and a seal main body 22 which is integrally provided in the metal ring 21 by a rubber-like elastic material.

The metal ring 21 in the seal ring 2 is constituted by a fitting tube portion 21a fitted and attached to an outer peripheral surface of the cylinder portion 12 of the piston main body 1 with a suitable fastening margin, and a flange portion 21b extending to an inner side in the diametrical direction from one end in the axial direction of the fitting tube portion 21a via a bent portion 21c, and opposing to the surface in the hydraulic chamber O in the pressure receiving portion 11 of the piston main body 1 in the axial direction.

The seal main body 22 in the seal ring 2 is constituted by a first seal lip 221 which is formed so as to be positioned in an outer periphery of the bent portion 21c of the metal ring 21 and is brought into close contact with a cylindrical inner surface (an inner peripheral surface of an outer tube portion 32) of the clutch cylinder 3 so as to be slidable in the axial direction, a second seal lip 222 which extends as a conical tubular shape from an inner diameter end portion of the flange portion 21b to an inner periphery side so as to be brought into close contact with the surface in the hydraulic chamber O side in the pressure receiving portion 11 of the piston main body 1, and an axial direction compression seal portion 223 which is provided in an opposite surface to the pressure receiving portion 11 in the inner peripheral portion of the flange portion 21b so as to be interposed with respect to the pressure receiving portion 11 in a state of being compressed in the axial direction, and a film-like base portion 224 which extends in such a manner as to coat an outer peripheral surface of the fitting tube portion 21a of the metal ring 21 and a surface in the hydraulic chamber O side of the flange portion 21b.

In other words, the seal ring 2 is manufactured by vulcanization adhering the seal main body 22 made of the rubber-like elastic material to the metal ring 21 at the same time of molding the seal main body 22, by applying a vulcanization adhesive agent to the metal ring 21 manufactured as the annular shape approximately having the L-shaped cross sectional form in accordance with the plastic working or the like, positioning and setting within the predetermined metal mold so as to mold clamp, and filling the unvulcanized molding rubber material within a cavity defined between an inner surface of the metal mold and the metal ring 21 so as to heat and pressure.

In the example shown in FIG. 1, a close contact surface with the pressure receiving portion 11 of the piston main body 1 in the axial direction compression seal portion 223 forms a flat surface which is approximately orthogonal to the axis, a shape modified example shown in FIG. 2 is obtained by forming a seal protrusion 223a for increasing a seal surface pressure caused by an axial direction compression in the close contact surface with the pressure receiving portion 11 in the piston main body 1, and a shape modified example shown in FIG. 3 is obtained by forming the close contact surface with the pressure receiving portion 11 in the piston main body 1 as a circular arc shaped convex surface 223b.

In the piston 1 for the hydraulic clutch in accordance with the first embodiment structured as mentioned above, since the seal ring 2 is assembled in the piston main body 1 after manufacturing the seal ring 2 as the independent member from the piston main body 1, it is not necessary to manufacture the large-scaled and complicated metal mold as is different from the case of manufacturing the seal integral type piston (the bonded piston seal) in which the seal portion is integrally formed in the piston main body, even in the piston having a large diameter and a complicated cross sectional shape. Since the seal ring 2 can be manufactured by integrally forming the seal main body 22 in the metal ring 21 having an approximately simple L-shaped cross sectional form as mentioned above, it is possible to reduce a manufacturing cost.

Further, since the seal ring 2 is structured such that the second seal lip 222 extending as the conical tubular shape from the inner diameter end portion of the flange portion 21b in the metal ring 21 is brought into close contact with the surface in the hydraulic chamber O side in the pressure receiving portion 11 of the piston main body 1, and has a self-sealing function that the surface pressure of the second seal lip 222 with respect to the pressure receiving portion 11 is increased in accordance with the increase of the hydraulic pressure of the hydraulic chamber O, an excellent sealing performance can be achieved. Further, since the axial direction compression seal portion 223 is provided in the outer periphery side thereof, a two-stage seal structure is obtained together with the second seal lip 222. Since the axial direction compression seal portion 223 is interposed in the compression state between the flange portion 21b of the metal ring 21 and the pressure receiving portion 11 of the piston main body 1, and achieves a certain degree of self-sealing function on the basis of the hydraulic pressure of the hydraulic chamber O, the sealing performance is further improved.

Further, in accordance with this structure, since the second seal lip 222 is extended as the conical tubular shape from the inner diameter end portion of the flange portion 21b in the metal ring 21, it is not necessary to work the step portion or the like for setting the seal in the flange portion 21b. Accordingly, it is possible to reduce the manufacturing cost.

Figure 4:
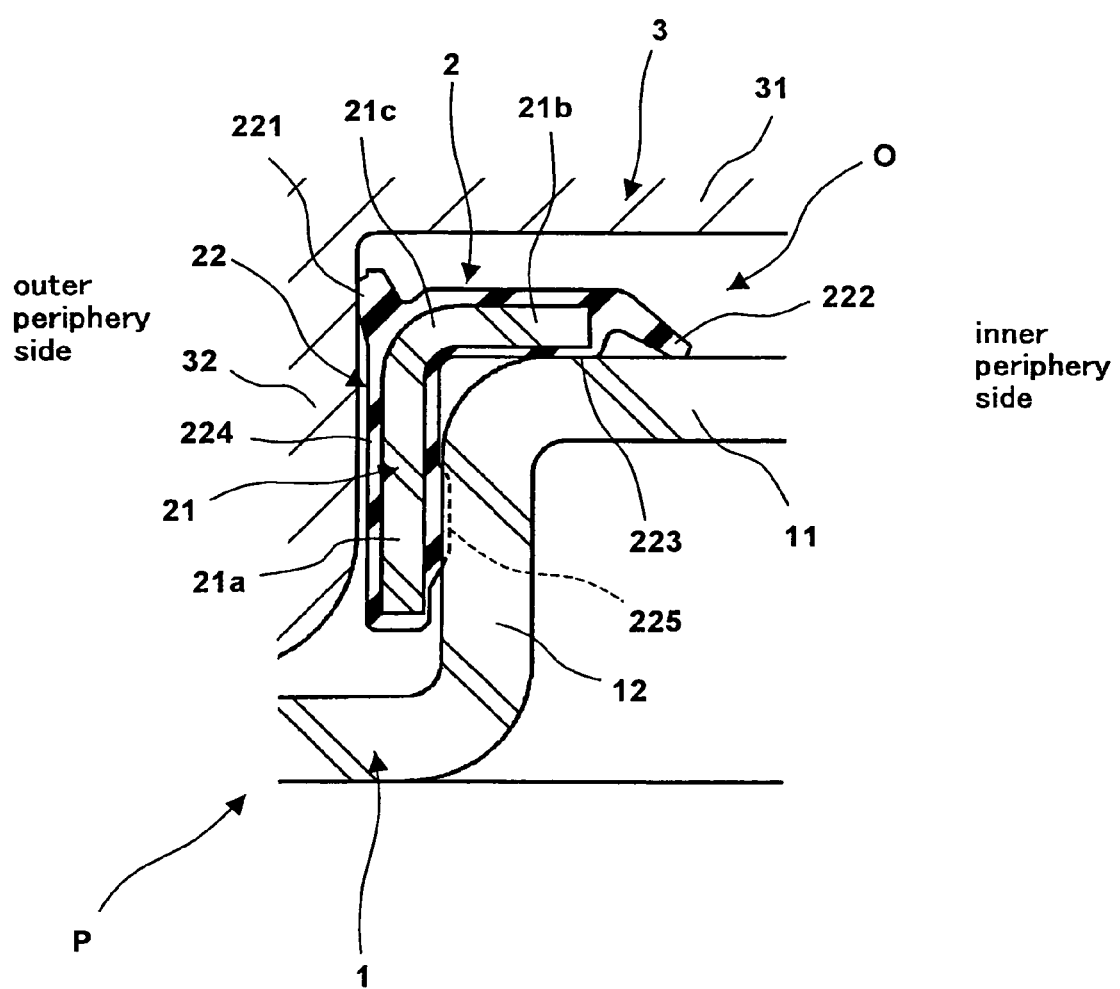
FIG. 4 is a cross sectional view of a main portion showing a second embodiment of the piston for the hydraulic clutch in accordance with the present invention by cutting by a plane passing through an axis together with a part of a clutch cylinder.
Figure 5:
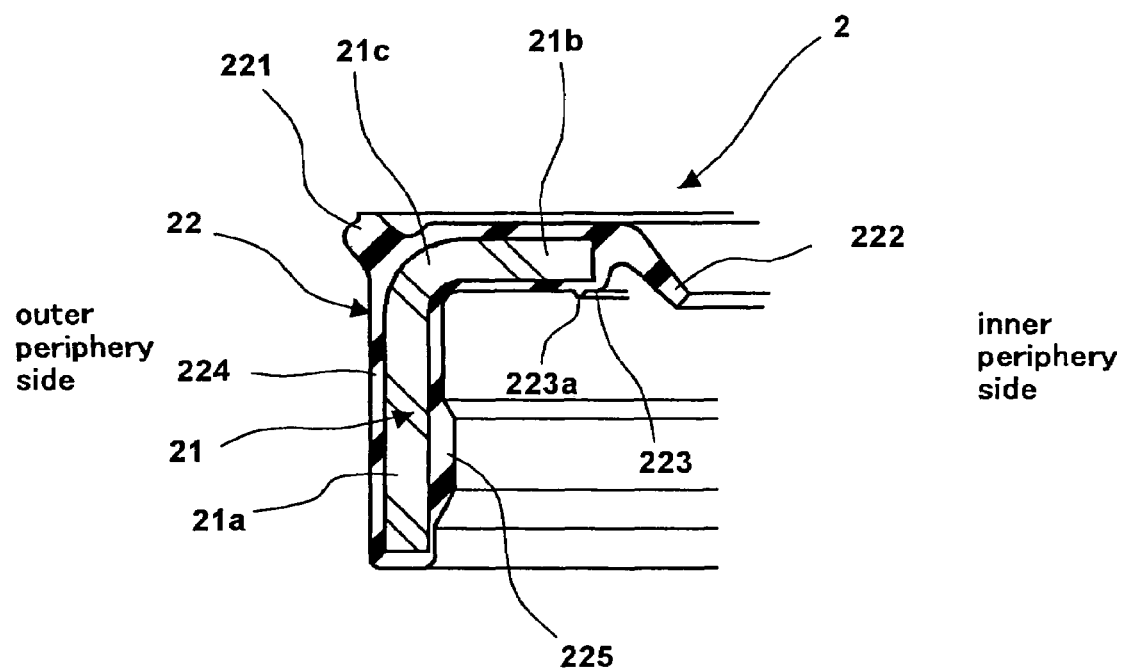
FIG. 5 is a cross sectional view of a main portion showing a modified example of a shape of a seal ring in the second embodiment by cutting a plane passing through an axis.
Figure 6:
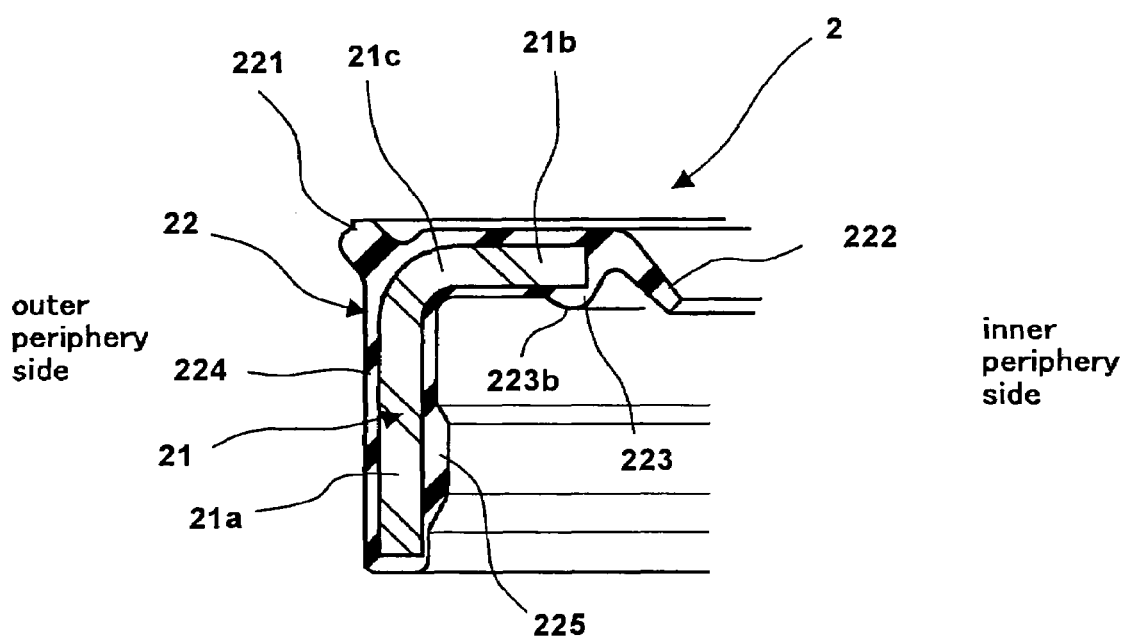
FIG. 6 is a cross sectional view of a main portion showing the other modified example of the shape of the seal ring in the second embodiment by cutting a plane passing through an axis.

Next, FIG. 4 is a cross sectional view of a main portion showing a piston for a hydraulic clutch in accordance with a second embodiment of the piston for the hydraulic clutch in accordance with the present invention by cutting by a plane passing through an axis together with a part of a clutch cylinder, and FIGS. 5 and 6 are cross sectional views respectively showing shape modified examples of a seal ring in the second embodiment by cutting by a plane passing through an axis.

The second embodiment is different from the first embodiment described above, in a point that the film-like base portion 224 of the seal main body 22 in the seal ring 2 extends in such a manner as to coat a whole of the surface of the metal ring 21, a portion coating the opposing surface to the pressure receiving portion 11 of the piston main body 1 in the inner peripheral portion of the flange portion 21b of the metal ring 21 is set to the axial direction compression seal portion 223 brought into close contact with the pressure receiving portion 11 in the compressed state, in the film-like base portion 224, and a diametrical direction compression seal portion 225 interposed with respect to the cylinder portion 12 of the piston main body 1 in the state of being compressed in the diametrical direction is formed in the portion coating the inner peripheral surface (that is, the opposing surface to the cylinder portion 12 in the piston main body 1) of the fitting tube portion 21a of the metal ring 21. The other portions are basically structured as the first embodiment.

Accordingly, in this embodiment, the example shown in FIG. 4 may be modified in the same manner as the first embodiment. In other words, the embodiment shown in FIG. 4 is structured such that the close contact surface with the pressure receiving portion 11 of the piston main body 1 in the axial direction compression seal portion 223 is formed as the flat surface which is approximately orthogonal to the axis, however, may be formed as the seal protrusion 223a for increasing the seal surface pressure on the basis of the axial direction compression such as the shape modified example shown in FIG. 5, or may be formed as the circular arc shaped convex surface 223b such as the shape modified example shown in FIG. 6.

In accordance with the structure mentioned above, since the seal ring 2 has the diametrical direction compression seal portion 225, a three-stage seal structure is obtained together with the second seal lip 222 and the axial direction compression seal portion 223, and the sealing performance between the fitting portions of the seal ring 2 and the piston main body 1 is further improved, in addition to the effect obtained by the first embodiment described above.

Further, in the first embodiment, since the metal ring 21 of the seal ring 2 forms the fitting between the metals with respect to the outer peripheral surface of the cylinder portion 12 of the piston main body 1, in the inner peripheral surface of the fitting tube portion 21a, it is necessary to severely set a dimensional tolerance in both of the piston main body 1 and the metal ring 21 to some extent, in order to suppress a dispersion of the fitting force. However, in accordance with the second embodiment, it is possible to effectively absorb the dispersion of the fitting force due to the dimensional tolerance of the fitting tube portion 21a of the metal ring 21 and the cylinder portion 12 of the piston main body 1, by the dimensional direction compression seal portion 225. Therefore, it is not necessary to severely set the dimensional tolerance of the fitting tube portion 21a of the metal ring 21 and the cylinder portion 12 of the piston main body 1, whereby it is possible to achieve the reduction of the manufacturing cost.

What is claimed is:

1. A piston for a hydraulic clutch comprising:
    a piston main body having a pressure receiving portion extending in a diametrical direction and a cylinder portion bent from the pressure receiving portion so as to extend, and arranged within a clutch cylinder so as to be movable in an axial direction; and
    a seal ring fitted and attached to the piston main body,
    said seal ring including:
        a metal ring constituted by a fitting tube portion fitted and attached to said cylinder portion and a flange portion extending in a diametrical direction from one end in the axial direction so as to oppose said pressure receiving portion in the axial direction; and
        a seal main body integrally formed on the metal ring and made of an elastic material,
    said seal main body including:
        a film base portion coating an entire surface of the metal ring;
        a first seal lip integrally formed on the film base portion and brought into close contact with a cylindrical inner surface of said clutch cylinder so as to be slidable in the axial direction;
        a second seal lip integrally formed on the film base portion and extending from an end portion of said flange portion so as to be brought into close contact with said pressure receiving portion;
        an axial direction compression seal portion integrally formed on the film base portion and provided on an opposing surface to said pressure receiving portion on said flange portion and interposed in a state of being compressed in the axial direction with respect to said pressure receiving portion; and
        a diametrical direction compression seal portion integrally formed on the film base portion and provided on an opposing surface to said cylindrical tube on the fitting tube portion and interposed in a state of being compressed in the diametrical direction with respect to said cylindrical portion.

2. The piston for a hydraulic clutch according to claim 1, wherein said opposing surface to the pressure receiving portion on the axial compression seal portion is formed into a flat surface.

3. The piston for a hydraulic clutch according to claim 1, wherein the axial compression seal portion is provided on the opposing surface to the pressure receiving portion with a seal protrusion.

4. The piston for a hydraulic clutch according to claim 1, wherein the axial compression seal portion is provided on the opposing surface to the pressure receiving portion with a circular arc shaped convex surface.

* * * * *